UNITED STATES PATENT OFFICE 1,988,242

ARTIFICIAL WOOD COMPOSITION AND METHOD OF MAKING THE SAME

Paul H. Gugger and Walter E. Barentzen, New York, N. Y., assignors to Comolite Corporation, Long Island City, N. Y., a corporation of New York No Drawing. Application May 5, 1934, Serial No. 724,212

6 Claims. (Cl. 106—38)

This invention relates to a novel and improved composition which may be cheaply and efficiently made and which shall have substantially all of the desired properties of natural wood, such as ability to receive nails, screws, or other fastening means, and the ability to be cut, sawed, or turned. At the same time, the composition is homogeneous, thereby lacking the grain which is present in natural wood and which makes it possible for the wood to separate along well defined surfaces. The new composition also has such characteristics that it may be readily molded into desired shapes.

Numerous attempts have been made to produce an artificial wood composition which shall have the above qualities, but to our knowledge none of those attempts have been successful in producing such a composition as can be made commercially. One such attempt is disclosed in the United States patent to Louis Vezekenyi, 1,875,187. The proportions of ingredients and the method of mixing them outlined in that patent have been found not to yield a satisfactory product. On the other hand, the composition which we have developed has been found to be highly satisfactory and can be made commercially on a large scale.

One specific illustration will be given of a formula which has been found to be satisfactory, and we will also outline a method which likewise has been found satisfactory in the preparation of a composition according to that formula, although, of course, it is to be understood that various equivalent substances, methods, and steps may be used where found desirable or suitable.

The ingredients in this specific formula are the following, all quantities being given by weight:

- 44 lbs. sawdust
- 15 lbs. glue
- 12 oz. alum
- 12 oz. borax
- 12 oz. zinc sulphide
- 10 oz. liq. phenol
- 5 oz. linseed oil
- 4 oz. sodium silicate
- 4 oz. chromic acid 62 lbs. 11 oz.

To the above is added a total of approximately 42 lbs. of water in three different steps, which makes a total weight for the batch of approximately 104 lbs. 11 oz. The method by which the above ingredients may be made into the composition will now be described.

The first mixture formed, which may for convenience be referred to as the No. 1 mixture, is made by dissolving approximately 15 lbs. of glue in 39 lbs. or 4⅞ gallons of cold water. The glue is preferably first run animal glue, and we have found that satisfactory results have been obtained by using glue of the following characteristics:

Glue—Jelly strength _____ 371 grams
Viscosity _____ 137 millipoises
pH _____ 6.42
Foamless The solution of glue in water is allowed to stand until the glue has absorbed all of the water. The solution is then placed in a double boiler, in a glue kettle, or other suitable container, and heated to approximately 140° F. or until it has been completely and thoroughly liquefied.

The mixture, which for convenience will be referred to as mixture No. 2, will now be described. This mixture consists of the following:

- 12 oz. of ammonia alum
- 12 oz. of borax
- 12 oz. of zinc sulphide

The above ingredients are in powder form and are in the form usually obtainable commercially. They are mixed with 10 ounces of water until a thick paste has been formed. Then an additional 10 ounces of water is added to the paste, and the mixing is continued until a milky like substance has been formed. We have found that the addition of water in these two steps aids very materially in insuring a satisfactory product and in the success of subsequent steps in the method.

What we shall for convenience refer to as mixture No. 3 is now formed, this mixture consisting of 4 ounces of chromic acid and 1 lb. 4 oz. of water.

What we shall for the sake of convenience refer to as mixture No. 4 is then formed, this mixture consisting of five ounces of linseed oil and 10 ounces of liquid phenol.

We next form what we shall for convenience identify as mixture No. 5, although in fact it is not a mixture, but consists of 4 ounces of sodium silicate which is heated to approximately 140° F.

The final step in the method may now be performed, and this consists in placing the No. 1 mixture in a suitable container, for example one of about 15 gallon capacity, and agitating that mixture by a suitable mixing device, for example one rotating at about 400 R. P. M. After thorough agitation, mixture No. 2 is added slowly to the container, the slowness of the addition preventing curdling. The mixing is continued until the ingredients so far placed in the container are thoroughly blended together.

While the mixer is still in operation, mixtures 3, 4, and 5 may be added, preferably in sequence according to their numbers, and mixing is again continued until the ingredients are all thoroughly mixed or blended together.

The mixture which has been obtained from the above method may for convenience be identified as mixture No. 6, and this mixture is now poured into a mechanical double arm mixer containing approximately 44 lbs. of hard wood sawdust, graded 24 and finer. The sawdust is preferably hard wood, and either birch or maple or a combination of the two is preferable, as such woods are free of tannic or other undesirable acids. Mixing is now performed for about three minutes and preferably not much longer, as too much mixing, particularly at this stage, is apt to generate too much heat for the success of the method.

The method is now completed and the material should be removed from the mixer for seasoning. This may conveniently be done by placing the material in shallow pans and allowing it to season at room temperature and in the open atmosphere for about ten minutes. The exact or approximate time which is proper for this seasoning may be determined by noting the change in color of the composition. This color is light yellow before the seasoning takes place, but gradually changes to a dark brown. When it has reached this stage, the material should be broken up into small loose particles, which may be done by any suitable means, for example by the hands of an operator, as the material at this stage may be safely handled.

The material is now available for molding, and we have found that it may be molded very rapidly at a pressure varying from 3500 lbs. to 6500 lbs. per square inch. For example, when molding heels for women's shoes at some such pressure as just mentioned, the molds need be closed only about three seconds in order to form the article. With other products, of course, the above figures may vary. After molding, the article is dried by any suitable means, and we have found that with shoe heels of the above type, suitable curing and drying may be accomplished at a temperature of about 90° F., with a forced air circulation, the drying and curing taking approximately four days.

The formula and the method outlined above have given excellent results, particularly when manufacturing heels for women's shoes, although, of course, we realize that certain changes may be necessary or desirable in making other articles. We are also aware that certain chemical or physical equivalents may be substituted for the various ingredients which we have mentioned in the above specific formula. We are also, of course, aware that various changes may be made in the detail steps of the method which we have outlined. For example, zinc sulphide may be replaced by a composition sold under the trade name of "Cryptone", which contains approximately 50% of zinc sulphide and 50% of barium sulphate. We mention this one substitution as one which we have found can be made, and are not in any way indicating that that is the only substitution of known equivalents which is possible.

We have found that the above composition, particularly when molded into a certain form, is capable of being waterproofed very effectively. This may be done by submerging the molded article, as, for example, a shoe heel, in a 40% solution of formaldehyde for a few seconds. The strength of the solution and the time of immersion will of course vary for different articles. We have found that the above solution and time, when practiced with heels for women's shoes, renders those heels impervious to water.

We give below a tabulation of the approximate percentages of the various ingredients, and these approximate percentages will be referred to in some of the claims.

|  | Per cent |
|---|---|
| Sawdust 44# | 42.025 |
| Glue—dry 15# | 14.327 |
| Alum 0.75# | 0.716 |
| Borax 0.75# | 0.716 |
| Zinc sulphide 0.75# | 0.716 |
| Phenol 0.625# | 0.597 |
| Linseed oil 0.3125# | 0.298 |
| Sodium silicate 0.25# | 0.239 |
| Chromic acid 0.25# | 0.239 |

We claim:

1. An artificial wood composition comprising by weight approximately 42% sawdust, 14% glue, and approximately 40% water, with small portions of alum, borax, a sulphide, an oil, phenol, and chromic acid.

2. An artificial wood composition having substantially the following percentages of ingredients:

|  | Percent |
|---|---|
| Sawdust | 42 |
| Glue | 14.3 |
| Water | 40 |
| A mixture of alum, borax, and a sulphide | 2.1 |
| Phenol | 0.6 |
| Oil, a silicate, and chromic acid | 0.8 |

3. The method of forming an artificial wood composition which comprises mixing equal quantities of alum, borax, and a sulphide with an amount of water sufficient to form a thick paste, then adding an approximately equal amount of water, adding said mixture to a glue solution, and mixing said solution with sawdust.

4. The method of forming an artificial wood composition which comprises forming a solution of glue and cold water, heating said solution, adding thereto a solution of equal parts of alum, borax, and a sulphide, then adding a mixture of chromic acid with water and oil, adding a mixture of oil and phenol, then adding a small quantity of heated sodium silicate, and then adding fine hard wood sawdust.

5. The method of forming an artificial wood composition which comprises dissolving 15 lbs. of first run animal glue in 39 lbs. of cold water, heating the solution to approximately 140° F., adding thereto a solution in water of 12 oz. each of alum, borax, and zinc sulphide, further adding a mixture of 4 oz. of chromic acid with 12 oz. of water, further adding a mixture of 5 oz. of linseed oil with 10 oz. of liquid phenol, further adding 4 oz. of sodium silicate which has been heated to 140° F., mixing the result of the above steps with 44 lbs. of fine hard wood sawdust, and agitating for approximately three minutes.

6. The method of forming an artificial wood composition which comprises dissolving 15 lbs.

of first run animal glue in 39 lbs. of cold water, heating the solution to approximately 140° F., adding thereto a solution of water of 12 oz. each of alum, borax, and zinc sulphide, further adding thereto a solution in water of 12 oz. 12 oz. of water, further adding a mixture of 5 oz. of linseed oil with 10 oz. of liquid phenol, further adding 4 oz. of sodium silicate which has been heated to 140° F., mixing the result of the above steps with 44 lbs. of fine hard wood sawdust, agitating for approximately three minutes, seasoning the resulting material in thin layers about ten minutes, and breaking up the material into loose particles for use in molding.

PAUL H. GUGGER.
WALTER E. BARENTZEN.

CERTIFICATE OF CORRECTION.

Patent No. 1,988,242. January 15, 1935.

PAUL H. GUGGER, ET AL.

It is hereby certified that error appears in the printed specification of the above numbered patent requiring correction as follows: Page 3, first column, line 3, claim 6, for "of" first occurrence read in; and line 5, strike out the words "thereto a solution in water of 12 oz." and insert instead a mixture of 4 oz. of chromic acid with; and that the said Letters Patent should be read with these corrections therein that the same may conform to the record of the case in the Patent Office.

Signed and sealed this 22nd day of January, A. D. 1935.

Leslie Frazer
Acting Commissioner of Patents.

(Seal)

CERTIFICATE OF CORRECTION.

Patent No. 1,988,242.  January 15, 1935.

PAUL H. GUGGER, ET AL.

It is hereby certified that error appears in the printed specification of the above numbered patent requiring correction as follows: Page 3, first column, line 3, claim 6, for "of" first occurrence read in; and line 5, strike out the words "thereto a solution in water of 12 oz." and insert instead a mixture of 4 oz. of chromic acid with; and that the said Letters Patent should be read with these corrections therein that the same may conform to the record of the case in the Patent Office.

Signed and sealed this 22nd day of January, A. D. 1935.

(Seal)

Leslie Frazer
Acting Commissioner of Patents.